(12) United States Patent
Kun et al.

(10) Patent No.: US 8,194,766 B2
(45) Date of Patent: Jun. 5, 2012

(54) CONSTANT FALSE ALARM RATE ROBUST ADAPTIVE DETECTION USING THE FAST FOURIER TRANSFORM

(75) Inventors: David S. Kun, Torrance, CA (US); Neil Morgan, Torrance, CA (US)

(73) Assignee: The Aerospace Corporation, El Segundo, CA (US)

( * ) Notice: Subject to any disclaimer, the term of this patent is extended or adjusted under 35 U.S.C. 154(b) by 469 days.

(21) Appl. No.: 12/471,191

(22) Filed: May 22, 2009

(65) Prior Publication Data

US 2010/0296565 A1 Nov. 25, 2010

(51) Int. Cl.
*H04L 25/06* (2006.01)
*H04K 1/10* (2006.01)
(52) U.S. Cl. ........................ 375/260
(58) Field of Classification Search ............. 375/145, 375/227, 350, 130, 340, 346, 317, 354, 316
See application file for complete search history.

(56) References Cited

U.S. PATENT DOCUMENTS

| 5,323,337 | A  |   | 6/1994  | Wilson et al.         |
|-----------|----|---|---------|-----------------------|
| 5,469,115 | A  | * | 11/1995 | Peterzell et al. ............... 330/129 |
| 7,053,815 | B1 | * | 5/2006  | Joynson et al. ................. 342/62 |
| 2005/0117666 | A1 | * | 6/2005 | Paul et al. ..................... 375/317 |
| 2009/0231220 | A1 | * | 9/2009 | Zhang et al. ................... 343/722 |
| 2009/0310712 | A1 | * | 12/2009 | Nakatani ..................... 375/316 |

OTHER PUBLICATIONS

Janne Lehtomaki, "Analysis of Energy Based Signal Detection", Oulu University Press, 2005.*
Lehtomaki et al., Analysis of Energy based Siganl Detection, Dec. 2005, University of Oulu.*
Wang, S.; Patenaude, F.; Inkol, R., "Upper and Lower Bounds for the Threshold of the FFT Filter Bank-based Summation CFAR Detector," *ICASSP 2006 Proceedings*, vol. 3 (May 2006), pp. 289-292.

* cited by examiner

*Primary Examiner* — David C. Payne
*Assistant Examiner* — Wednel Cadeau
(74) *Attorney, Agent, or Firm* — Henricks, Slavin & Holmes LLP

(57) ABSTRACT

A signal detection apparatus includes electronics configured to receive an RF input and to process the RF input applying a decision rule that is a normalized quantity to determine if a man-made signal is present or if only noise is present while achieving a constant false alarm rate.

18 Claims, 7 Drawing Sheets

CONSTANT FALSE ALARM RATE ROBUST ADAPTIVE DETECTION USING THE FAST FOURIER TRANSFORM

TECHNICAL FIELD

The invention relates generally to signal detection and, in particular, to receivers and techniques that use the Fast Fourier Transform to detect the presence of man-made signals and achieve a constant false alarm rate when only noise is present within a predetermined frequency band.

BACKGROUND ART

Classical Signal Detection

The problem of detecting the presence of signals in noise is a classical problem in statistical signal processing. In the case where the transmission of information is not a concern, the detection problem is then typically that of testing the presence or absence of a signal or signals. This detection problem may be formulated as a binary hypothesis test. That is, a decision is made between two hypotheses, $H_0$ and $H_1$ defined as follows:

$H_0$: only noise is present,
$H_1$: a signal or signals plus noise is present.

Detection is based on a decision statistic, C, that is some function of the received signal which is compared to a threshold, $\tau$. If the threshold is exceeded, $H_1$ is decided to be true, otherwise $H_0$ is true. This decision rule can be expressed as follows:

$$C \underset{H_0}{\overset{H_1}{\gtreqless}} \tau$$

The performance of the detector is often characterized in terms of the probability of detection $P_d$ and probability of false alarm $P_{FA}$. The probability of detection is the probability that $H_1$ is selected given that $H_1$ is true, i.e., $P_d = \Pr\{C > \tau | H_1\}$. The probability of false alarm is the probability that $H_1$ is selected given that $H_0$ is true, i.e., $P_{FA} = \Pr\{C > \tau | H_0\}$. In either case, the probability distribution of the decision statistic must be defined to specify either $P_d$ or $P_{FA}$.

The transmitted signals can be known, but with unknown parameters, or can be completely unknown. Hence, for a given decision statistic, accurately characterizing the probability of detection can be difficult, if not impossible, in certain realistic propagation environments. An alternative is to limit the chances of declaring a signal is present when no signal is present, i.e., appropriately setting the detection threshold for a given probability of false alarm. Setting the threshold requires knowledge of the probability distribution of the decision statistic under $H_0$. A processor wherein the threshold is adjusted to maintain a certain $P_{FA}$ falls under the class of constant false alarm rate, CFAR, detectors.

Signal Detection Using the FFT

A common decision statistic that is used to determine if man-made signals are present in a particular portion of the frequency spectrum is the magnitude squared of the discrete Fourier transform (DFT) outputs of a sampled input time series from the environment. Let x[n] be a length N sampled input of measurements within some frequency band. In general, x[n] are complex values. The discrete Fourier transform of x[n] may be defined as $$X[k] = \sum_{n=0}^{N-1} x[n] \exp\left(-j\frac{2\pi}{N}nk\right)$$

where k=0, . . . ,N−1 and $j=\sqrt{-1}$. In practice, the DFT may be computed efficiently with the Fast Fourier Transform (FFT) algorithm. To detect man-made energy in the k-th FFT bin, one may use the following decision rule and statistic $$|X[k]|^2 \underset{H_0}{\overset{H_1}{\gtreqless}} \tau.$$

Typically, x[n] is multiplied by a window function w[n] of length N so that one can distinguish energy in different bands. The most basic window function w[n] is where all the elements are equal to 1 and is commonly referred to as the rectangular window. Therefore, the discrete Fourier transform of the windowed sequence is $$X[k] = \sum_{n=0}^{N-1} x[n]w[n]\exp\left(-j\frac{2\pi}{N}nk\right).$$

Depending on the application and detection strategy, multiple X[k]'s can be used in a decision rule. An example is outlined in R. Inkol, S. Wang and F. Patenaude, "Upper and Lower Bounds for the Threshold of the FFT Filter Bank-based Summation CFAR Detector," ICASSP 2006 Proceedings, Vol 3, pp 289-292, May 2006.

Problems With Prior Art

Many conventional detectors are deficient in that their detection functionality is dependent upon having an accurate estimate of the noise power. For example, some conventional detectors, under certain environments where the signal-to-noise power ratio can change abruptly, e.g., wireless channels, cannot change their detection threshold without having to restart their numerical algorithm to estimate the noise power.

The FFT-based detection procedure described in U.S. Pat. No. 5,323,337 to Wilson et al. entitled "Signal Detector Employing Mean Energy and Variance of Energy Content Comparison for Noise Detection" detects noise at certain FFT bins. However, a problem with this procedure is that it does not provide quantitative values for the noise detection threshold. Thus, the Wilson et al. detection procedure does not guarantee that a certain false alarm rate will be achieved.

Two disadvantages of prior techniques that use the FFT for detecting man-made energy within frequency bands are: 1) the computationally intensive nature of the method for determining the threshold, the method also requiring a calibration period to estimate the statistics of the environment, namely the noise variance, and 2) the inability to immediately adapt to abrupt changes in the environment such as signal and/or noise power fluctuations, which create unexpected and oftentimes higher false alarm rates.

It would be useful to be able to provide a signal detection technology that overcomes or mitigates one or more of the disadvantages of prior FFT-signal detection techniques.

SUMMARY OF THE INVENTION

Example embodiments described herein involve signal detection techniques using the Fast Fourier Transform (FFT)

that instantaneously react to rapid changes in the signal while achieving a constant false alarm rate, CFAR, without resorting to calibration or collection methods to estimate the key statistical parameters of the environment in which the signal resides. Example embodiments employ a decision rule that immediately adjusts to power fluctuations, which overcomes the disadvantage of prior signal detection techniques of being unable to immediately adapt to abrupt changes in the environment. Example embodiments derive the probability distribution of the decision statistic that results in a detection threshold that is independent of the noise variance, FFT window type, and the statistics of the environment, which overcomes the disadvantage of prior signal detection techniques of requiring a calibration period to estimate the statistics of the environment.

In an example embodiment, a signal detection apparatus includes electronics configured to receive an RF input and to process the RF input applying a decision rule that is a normalized quantity (e.g., normalized power ratio) to determine if a man-made signal is present or if only noise is present while achieving a constant false alarm rate. In an example embodiment, the decision rule represents examining the ratio of the power of the RF input within a single frequency bin to the total power of the RF input over the frequency band of interest. In an example embodiment, the decision rule determines an exact value of a decision statistic threshold, rather than resorting to upper and lower bounds or approximations. In an example embodiment, the decision statistic threshold ranges from zero to one. In an example embodiment, the electronics are configured to employ the Fast Fourier Transform to detect the presence of man-made signals within a frequency band of interest without the need for implementing any calibration or noise power estimation techniques.

In an example embodiment, a signal detection apparatus includes a tunable bandpass filter that filters an RF input to generate a bandpass filter output signal, an IF double balanced mixer that downconverts the bandpass filter output signal to complex baseband, lowpass filters that receive outputs of the IF double balanced mixer, the lowpass filters being configured to act as anti-alias filters for I and Q channels and to output an IF waveform, analog-to-digital converters (ADCs) configured to sample the IF waveform into digital samples, and electronics configured to receive the digital samples and implement a decision rule to determine if a man-made signal is present or if only noise is present while achieving a constant false alarm rate.

DISCLOSURE OF INVENTION

Figure 1:
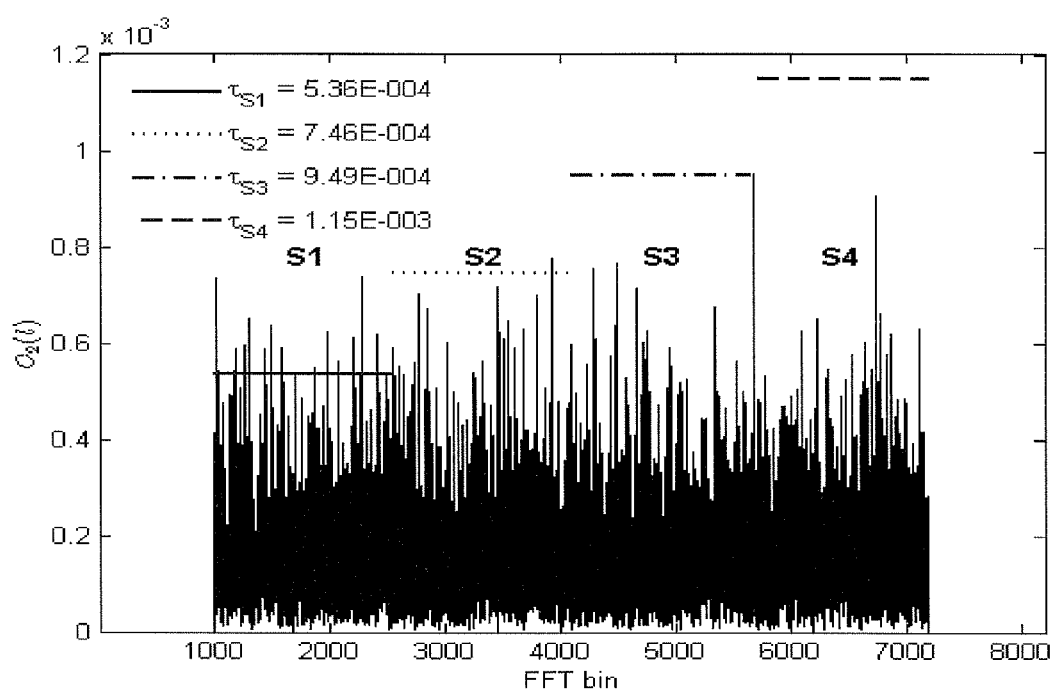
FIG. 1 is a pictorial representation of an example signal detection method implemented according to principles described herein.

Example embodiments of receivers and signal detection methods use a decision rule that does not need a priori knowledge of the noise power or signal power. The probability distribution of a suitable decision rule has been theoretically determined, so an exact value of the threshold can be determined instead of upper or lower bounds or other approximations. An example decision rule is set forth as follows:

$$C_M(l) = \frac{P_M(l)}{P_{Total}} = \frac{\sum_{m=0}^{M-1} |X_m[l]|^2}{\sum_{m=0}^{M-1} \sum_{k \in \kappa} |X_m[k]|^2} \underset{H_0}{\overset{H_1}{\gtrless}} \tau$$

where the below quantities represent the following:

| | |
|---|---|
| x[n] | Sequence of complex samples with length M · N |
| $x_m[n]$ | Subsequence of x[n] with length N such that no subsequence overlaps with each other; i.e., $x_m[n]$ = [x[mN], x[mN + 1], ..., x[mN + N − 1]] where m = 0, ..., M − 1 |
| N | number of points in the FFT of $x_m[n]$ |
| M | number of N-pt FFTs to be computed |
| $C_M(l)$ | l-th decision statistic, which represents the power in the l-th FFT bin versus the total power over all K FFT bins |
| K | size of the set κ; this is always less than or equal to N |
| κ | set of FFT bins to be included in the decision statistics |
| $P_M(l)$ | accumulated power in the l-th FFT bin after M N-pt FFTs have been computed |
| $P_{Total}$ | accumulated power over all FFT bins in κ after M N-pt FFTs have been computed |
| $X_m[k]$ | k-th bin of the N-pt FFT of the m-th windowed subsequence, $x_m[n] \cdot w[n]$ where w[n] is a real, length N, non-zero window sequence. |
| τ | decision statistic threshold; this quantity is bounded between 0 and 1 |

The requirement of prior signal detection techniques of having to estimate noise and/or signal power is eliminated because the decision rule computes a normalized power ratio. More specifically, when x[n] is white Gaussian noise, the power across all FFT bins in κ are equal. Subsequently, the l-th decision statistic $C_M(l)$ will represent 1/K of the total power $P_{Total}$. Thus, the algorithms to estimate noise power or variance have been eliminated. Furthermore, this rule immediately adapts to sudden power fluctuations due to this power normalization.

The deficient approaches of prior signal detection techniques in attempting to find the exact value of the threshold τ are overcome by analytically determining the probability distribution of the decision statistic $C_M(l)$ as described below.

A key aspect of the receiver and signal detection techniques described herein is their use of a decision rule that is a normalized quantity. To determine if a man-made signal is present at the l-th FFT bin, $C_M(l)$ needs to be greater than the threshold, τ; otherwise, only noise is determined to be present. The chance of declaring that a signal is present when only noise is present is the probability of false alarm, $P_{FA}$. This decision rule represents examining the power within one frequency bin relative to the total power of the selected frequency bins of interest. The decision statistic may be accumulated M times to provide a better power estimate.

Consider the following probability that $C_M(l)$ is less than the value of $\tau$, where $\tau$ is bounded between 0 and 1, $$Pr\{C_M < \tau\} = F_{C_M}(\tau)$$

where the dependence on the l-th FFT bin has been dropped. For $M \geq 1$, the cumulative distribution function (cdf), which is equal to $F_{C_M}(\tau)$, is as follows $$F_{C_M}(\tau) = 1 - \frac{\Gamma(M+L)}{\Gamma(M)\Gamma(L)} \int_0^{1-\tau} t^{L-1}(1-t)^{M-1} dt$$

with $0 \leq \tau \leq 1$, $L = M(K-1)$, and $\Gamma(n) = (n-1)!$ for a positive integer n. The corresponding probability density function (pdf) is obtained by differentiating with respect to $\tau$, which gives $$f_{C_M}(\tau) = \frac{\Gamma(M+L)}{\Gamma(M)\Gamma(L)}(1-\tau)^{L-1}\tau^{M-1}.$$

There is no dependence on the window function w[n], nor is there a dependence on the noise variance in the distribution of $C_M$. The mean and variance of $C_M$ are $$\mu = 1/K$$

$$\sigma^2 = \frac{1}{MK^2}\frac{MK-1}{MK+1}$$

The probability of false alarm is determined by the following formula $$P_{FA} = 1 - Pr\{C_M < \tau\}$$

$$= \frac{\Gamma(M+L)}{\Gamma(M)\Gamma(L)} \int_0^{1-\tau} t^{L-1}(1-t)^{M-1} dt$$

When M=1, the relationship between the threshold and false alarm probability can be explicitly solved and is as follows $$\tau = 1 - (P_{FA})^{1/K-1}.$$

For M>1, the threshold can be numerically determined. The following table shows the various values of the detection threshold for N=K=8192.

| Number of FFT computations, | Probability of false alarm, $P_{FA}$ | | | |
|---|---|---|---|---|
| M | 1.00E-02 | 1.00E-03 | 1.00E-04 | 1.00E-05 |
| 1 | 0.000562065 | 0.000842979 | 0.001123814 | 0.001404571 |
| 2 | 0.000405128 | 0.000563456 | 0.000717360 | 0.000868637 |
| 3 | 0.000342008 | 0.000456837 | 0.000566624 | 0.000673393 |
| 4 | 0.000306529 | 0.000398579 | 0.000485570 | 0.000569516 |
| 5 | 0.000283297 | 0.000361146 | 0.000434068 | 0.000504013 |
| 6 | 0.000266676 | 0.000334740 | 0.000398045 | 0.000458466 |
| 7 | 0.000254077 | 0.000314942 | 0.000371219 | 0.000424710 |
| 8 | 0.000244127 | 0.000299447 | 0.000350342 | 0.000398545 |
| 9 | 0.000236027 | 0.000286928 | 0.000333554 | 0.000377578 |
| 10 | 0.000229275 | 0.000276560 | 0.000319709 | 0.000360339 |
| 11 | 0.000223541 | 0.000267804 | 0.000308060 | 0.000345872 |
| 12 | 0.000218597 | 0.000260291 | 0.000298096 | 0.000333528 |
| 13 | 0.000214279 | 0.000253759 | 0.000289459 | 0.000322850 |
| 14 | 0.000210468 | 0.000248016 | 0.000281885 | 0.000313504 |
| 15 | 0.000207073 | 0.000242919 | 0.000275178 | 0.000305244 |
| 16 | 0.000204024 | 0.000238357 | 0.000269189 | 0.000297881 |

In the case where a subset of FFT bins are used, the following shows the detection threshold values for K=6190 and N=8192.

| Number of FFT computations, | Probability of false alarm, $P_{FA}$ | | | |
|---|---|---|---|---|
| M | 1.00E-02 | 1.00E-03 | 1.00E-04 | 1.00E-05 |
| 1 | 0.000743813 | 0.001115512 | 0.001487072 | 0.001858495 |
| 2 | 0.000536137 | 0.000745645 | 0.000949290 | 0.001149448 |
| 3 | 0.000452609 | 0.000604560 | 0.000749836 | 0.000891111 |
| 4 | 0.000405658 | 0.000527468 | 0.000642581 | 0.000753661 |
| 5 | 0.000374914 | 0.000477934 | 0.000574430 | 0.000666985 |
| 6 | 0.000352919 | 0.000442990 | 0.000526761 | 0.000606714 |
| 7 | 0.000336245 | 0.000416791 | 0.000491262 | 0.000562046 |
| 8 | 0.000323078 | 0.000396286 | 0.000463635 | 0.000527423 |
| 9 | 0.000312359 | 0.000379718 | 0.000441419 | 0.000499677 |
| 10 | 0.000303424 | 0.000365997 | 0.000423098 | 0.000476864 |
| 11 | 0.000295836 | 0.000354411 | 0.000407682 | 0.000457719 |
| 12 | 0.000289293 | 0.000344469 | 0.000394497 | 0.000441385 |
| 13 | 0.000283579 | 0.000335824 | 0.000383067 | 0.000427254 |
| 14 | 0.000278535 | 0.000328225 | 0.000373044 | 0.000414887 |
| 15 | 0.000274042 | 0.000321479 | 0.000364169 | 0.000403957 |
| 16 | 0.000270008 | 0.000315442 | 0.000356244 | 0.000394212 |

When K=6190<N, the threshold increases slightly from the case where K=N=8192. It is important to note that these thresholds apply for any non-zero window function w[n]. In contrast with prior techniques, the detection threshold is independent of the noise variance and the window function.

Given a probability of false alarm (sometimes referred to as false alarm rate) of 1e-5, it is observed that the threshold reduces. The variance of the decision statistic scales with the amount of averaging. The more averages that are taken, the smoother the spectrum will appear, which decreases the chance of sharp peaks causing a false alarm. For white Gaussian noise input, this spectrum is flat and will become smoother as more averages are taken at each FFT bin.

Floating-point Simulation Results

FIG. 1 is a pictorial representation of an example signal detection method implement according to principles described herein. The thin black lines represent the decision statistic, $C_M(l)$, for M=2, N=8192, and K=6190 for each l-th FFT bin in the set $\kappa$ in which only noise is present. The FFT bins below 1001 and above 7190 are excluded from detection and set to zero. There are four different thresholds $\{\tau_{S1}, \tau_{S2}, \tau_{S3}, \tau_{S4}\}$ that are set to achieve different false alarm rates over four contiguous subbands. Each subband S1 to S4 is a set of FFT bins. The threshold $\tau_{S1}$ in the subband S1 has the lowest threshold; thus, it will have the most false alarms as compared to the other subbands. The number of false alarms will decrease from subband S2 to S4 because their corresponding thresholds are respectively larger. FIG. 1 illustrates how different false alarm rates can be simultaneously imposed over different subbands. This also applies to individual FFT bins.

Figure 2A:
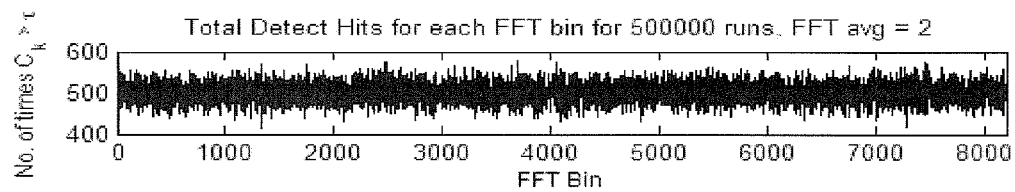
FIG. 2A shows the total detect hits for each FFT bin in an example floating point simulation of false alarm when only noise is present.
Figure 2B:
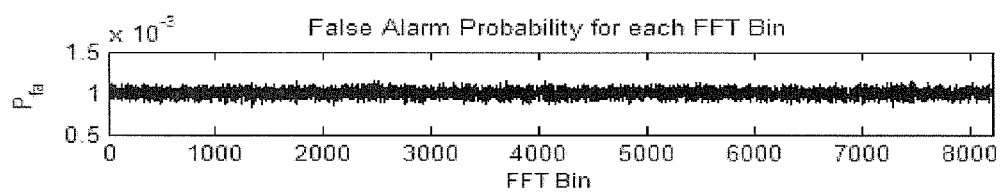
FIG. 2B shows the false alarm probability for each FFT bin for the simulation of FIG. 2A.
Figure 2C:
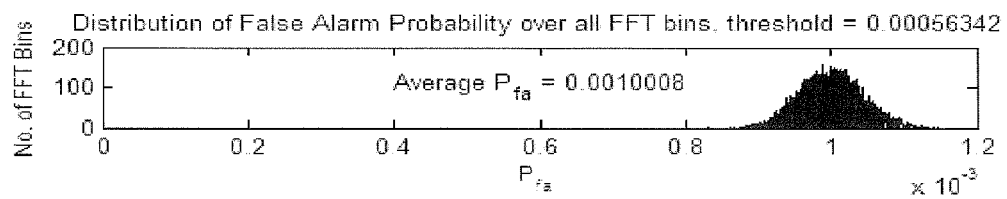
FIG. 2C shows the distribution of false alarm probability over all FFT bins for the simulation of FIG. 2A.

Floating point simulations were written using MATLAB to verify the probability of false alarm when only noise is present. An example of these simulations is shown in FIGS. 2A and 2B which illustrate that for a threshold of 0.00056342, with M=2, an average $P_{FA}$ of 0.001 is achieved. FIG. 2B is related to FIG. 2A by dividing the y-axis by the number of runs (500,000) to yield the false alarm probability, $P_{FA}$. This value is in agreement with the $P_{FA}$ assumption for this case. FIG. 2C shows the distribution of false alarm probability over all FFT bins.

Figure 3A:
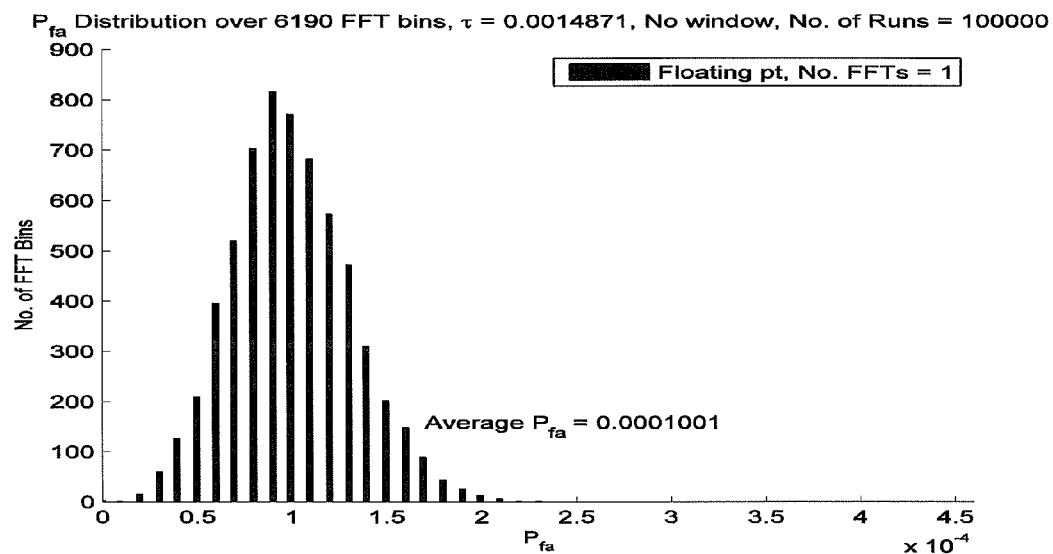
FIGS. 3A and 3B respectively illustrate the false alarm performance of an example embodiment of a detector with no window (i.e., rectangular) and with a Hamming window using Monte Carlo simulations.
Figure 3B:
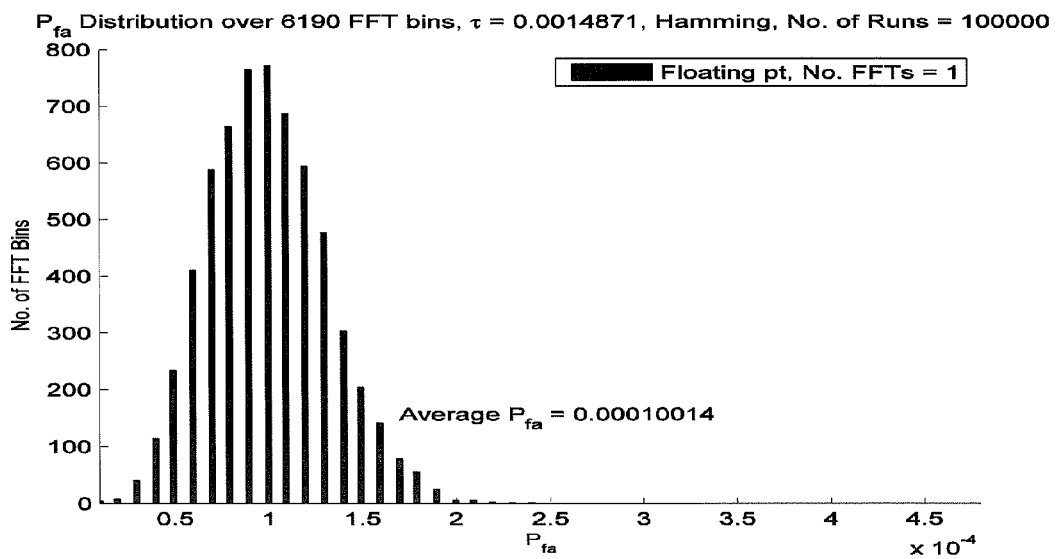

FIGS. 3A and 3B respectively illustrate the false alarm performance of an example embodiment of a detector with no window (i.e., rectangular) and with a Hamming window using Monte Carlo simulations. The rectangular window has all values of w[n] equal to 1. The Hamming window has values that are computed from the following equation $$w[n] = 0.54 - 0.46\cos\left(2\pi\frac{n}{N}\right), 0 \le n \le N$$

The threshold was set to 0.0014871 to achieve a false alarm probability of 1e-4 for N=8192, K=6190 and M=1 for the rectangular and Hamming window cases. The average false alarm probability across all FFT bins is very close to the desired $P_{FA}$ of 1e-4. It is readily seen that this detector performs the same regardless of the window as previously discussed.

Hardware Testbed

Figure 4:
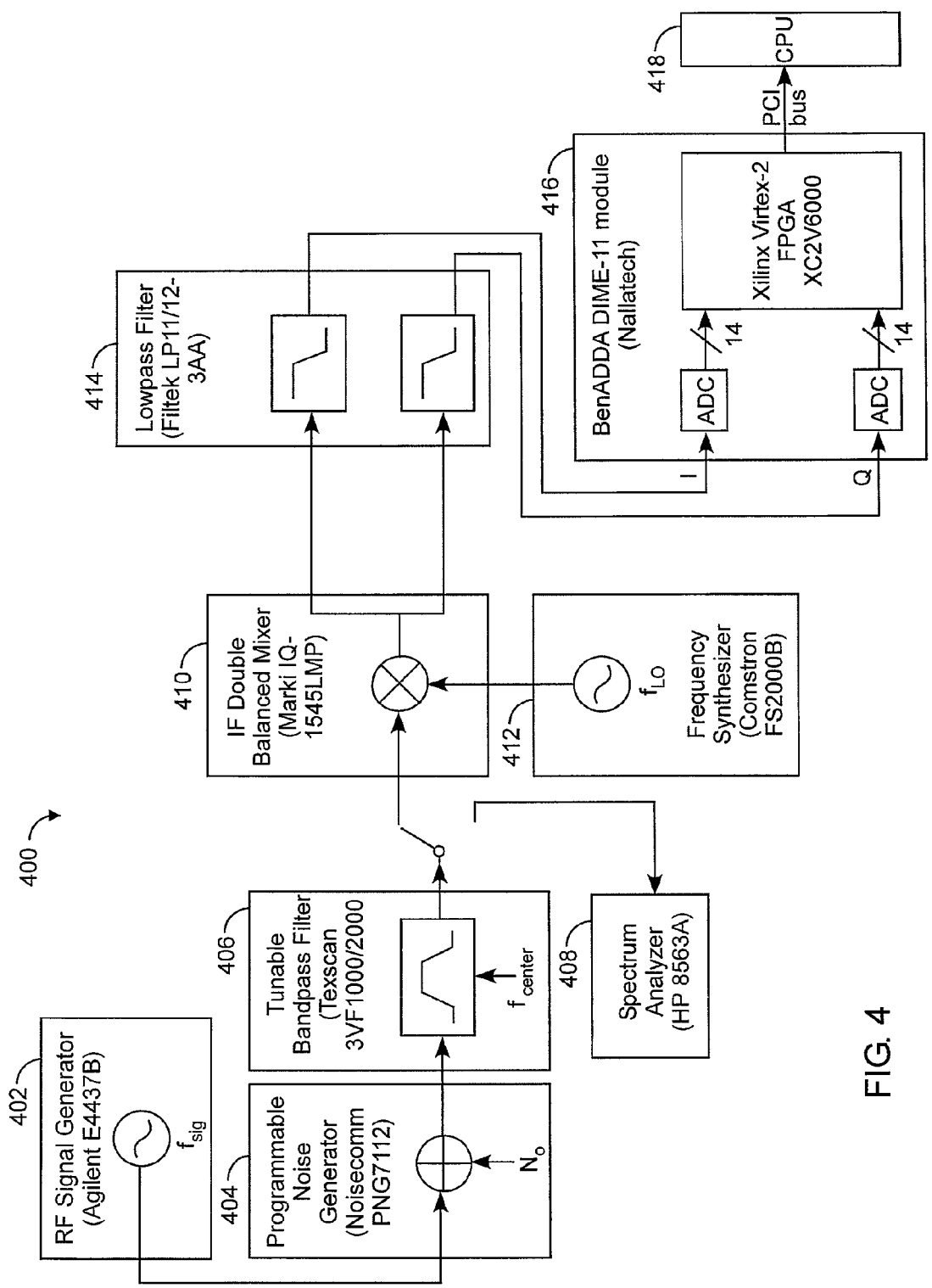
FIG. 4 shows an example embodiment of a signal detection setup (including receiver)

FIG. 4 shows an example embodiment of a signal detection setup (including receiver) 400. In this example embodiment, a RF signal generator 402 (e.g., Agilent E4437B), a programmable noise generator 404 (e.g., Noisecomm PNG7112), a tunable bandpass filter 406 (e.g., Texscan 3VF1000/2000), a spectrum analyzer 408 (e.g., HP 8563A), an IF double balanced mixer 410 (e.g., Marki IQ-1545LMP), a frequency synthesizer 412 (e.g., Comstron FS2000B), lowpass filters 414 (e.g., Filtek LP11/12-3AA), a BenADDA DIME-II module 416 (e.g., Nallatech), and a CPU 418 are configured as shown.

In this example embodiment, the signal detection setup 400 was used to analyze false alarm performance with a realistic non-ideal RF front-end. For false alarm performance, the output of the RF signal generator 402 was removed so that only white Gaussian noise would be present. The tunable bandpass filter 406 filters the noise, and the IF double balanced mixer 410 downconverts the noise to complex baseband. The lowpass filters 414 act as anti-alias filters for the I and Q rails. The analog-to-digital converters, ADCs, in module 416, sample the IF waveform into 12-bit digital samples which are, in turn, provided to an FPGA where the decision rule described herein is implemented. False alarm results are transferred to the CPU 418 via the PCI bus for postprocessing.

Figure 5:
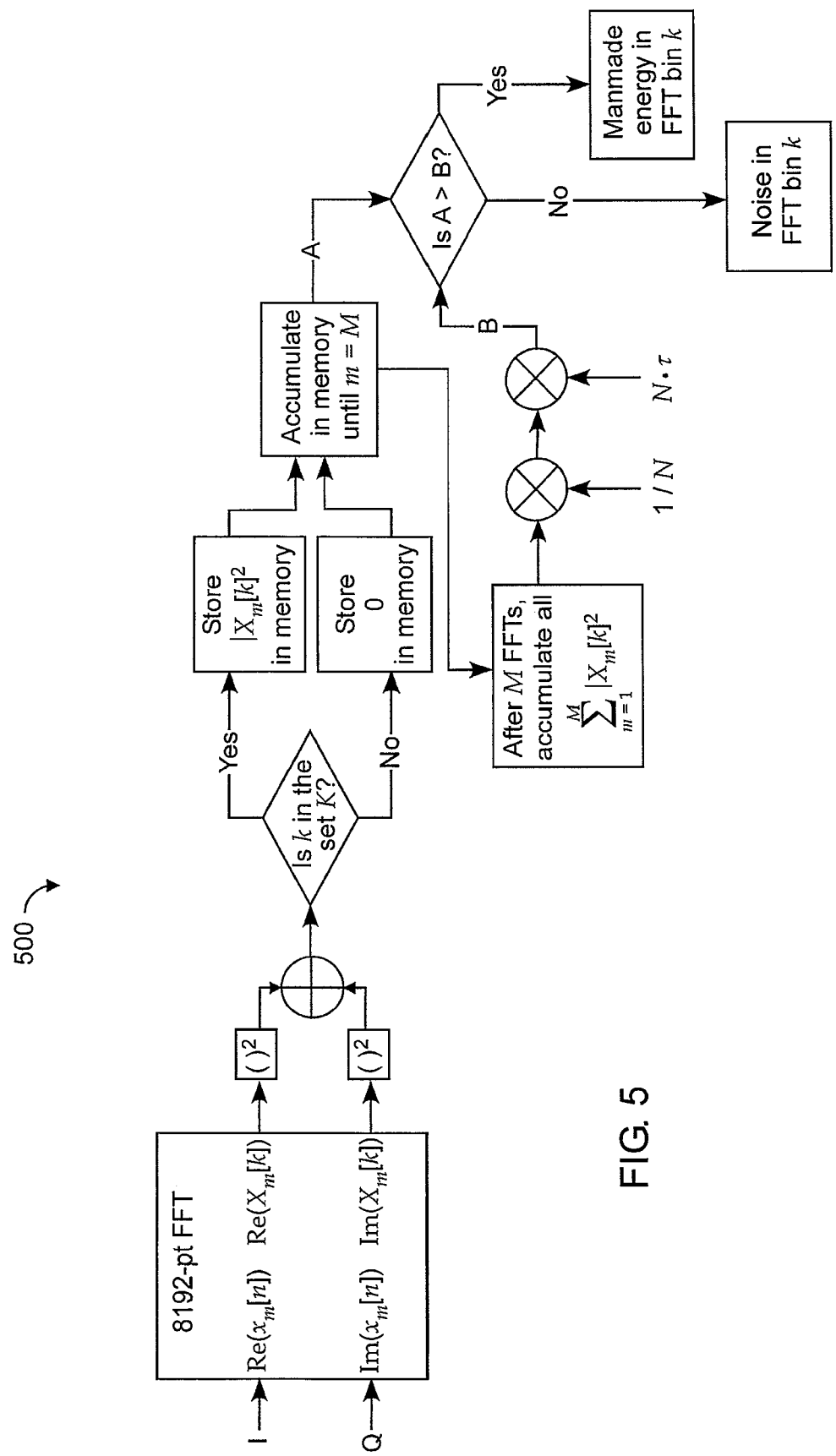
FIG. 5 is a block diagram 500 illustrating an example implementation of a decision rule.

FIG. 5 is a block diagram 500 illustrating an example implementation of a decision rule. As shown, the numerator of the k-th decision statistic is stored in memory. A total of K numerator statistics are stored in memory. After M FFTs have been computed, the denominator of the decision statistic is computed. Because the denominator can be quite large, in an example embodiment, this value is multiplied by 1/N to reduce bit precision. The resulting quantity is multiplied by N·τ. The net result is represented in FIG. 5 as B. The comparison of A to B is mathematically described as follows $$\sum_{m=0}^{M-1} |X_m[l]|^2 \underset{H_0}{\overset{H_1}{\gtreqless}} N \cdot \tau \frac{1}{N} \sum_{m=0}^{M-1} \sum_{k \in \kappa} |X_m[k]|^2$$

As can be seen, the hardware implementation (FIG. 4) is mathematically equivalent to the decision rule (FIG. 5).

False Alarm Performance

Figures 6A, 6B:
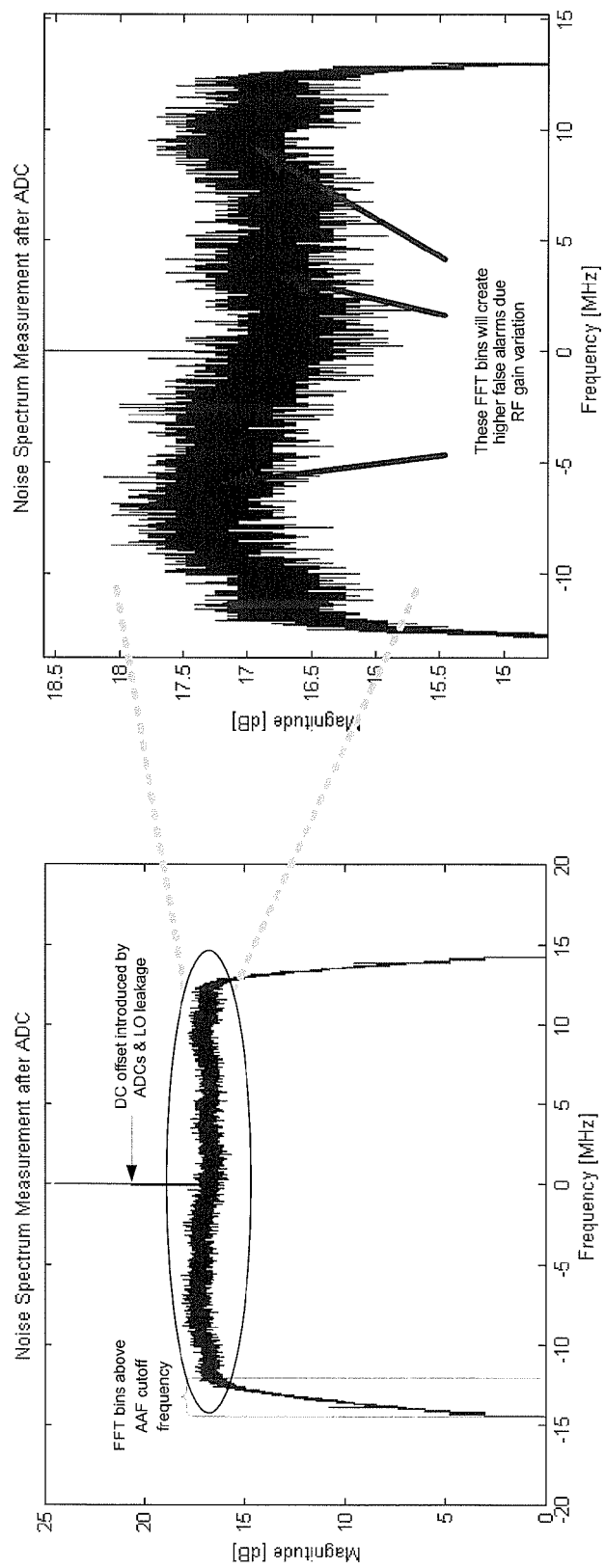
FIGS. 6A and 6B show plots that illustrate a hardware measurement, with the RF signal generator turned off, of the noise spectrum after ADC sampling.

FIGS. 6A and 6B show plots that illustrate a hardware measurement, with the RF signal generator turned off, of the noise spectrum after ADC sampling. Around 0 MHz, excessive power is created by the IF mixer and the non-zero DC offset from the ADCs. Outside the anti-aliasing filter (AAF) cutoff frequency, the input power is filtered. Hence, in an example embodiment, these FFT bins around 0 MHz and above the AAF cutoff frequencies are ignored to preserve false alarm performance.

Consequently, 2002 FFT bins were zeroed-out for this RF testbed setup and the threshold was set for the remaining K=6190 FFT bins. FIGS. 6A and 6B depict the gain variation of about 2 dB peak-to-peak in the RF chain.

Figures 7A, 7B:
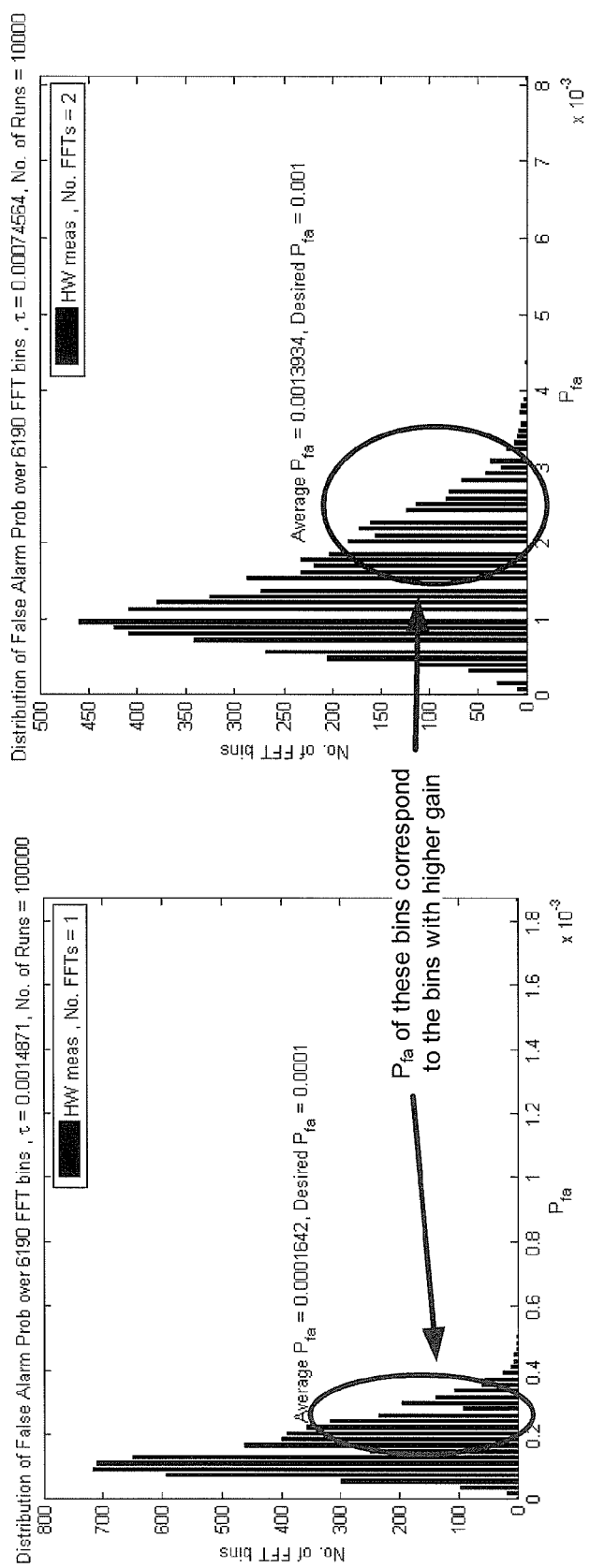
FIGS. 7A and 7B show plots of false alarm rate performance measured from 100,000 and 10,000 trials using M=1 and 2 FFT averages, respectively.

The false alarm rate performance shown in FIGS. 7A and 7B was measured from 100,000 and 10,000 trials using M=1 and 2 FFT averages, respectively. The 2002 FFT edge bins corresponding to the AAF cutoff frequencies and DC bins were excluded. As the FFT bins that have higher RF gain received more false alarms, even with a non-ideal RF front-end, the false alarm performance is not adversely affected and matches theoretical predictions.

The signal detection technologies described herein are directly applicable to receivers that use the Fast Fourier Transform to detect the presence of man-made signals within a predetermined frequency band. Detection of man-made signals is quite common in signal intelligence, electronic surveillance, and wireless networks. Employing the techniques described herein improves this type of receiver with the ability to easily discriminate between noise and man-made signals at any frequency band of interest without the need for implementing any calibration and noise power estimation techniques. It also has been shown that the signal detection receivers and techniques described herein are robust and relatively insensitive to non-ideal RF front-end effects such as gain ripple and frequency cutoffs.

Although the present invention has been described in terms of the example embodiments above, numerous modifications and/or additions to the above-described embodiments would be readily apparent to one skilled in the art. It is intended that the scope of the present invention extend to all such modifications and/or additions.

What is claimed is:

1. A signal detection apparatus, comprising:
electronics configured to receive an RF input and to process the RF input applying a decision rule that utilizes Fast Fourier Transforms (FFTs) of non-overlapping sub-sequences for a window function to generate K decision statistics whose cumulative distribution function (cdf) yield, independent of the noise variance and the FFT window type, a numerical value for the threshold, τ, of each decision statistic to determine if a man-made signal is present or to achieve a constant false alarm rate when only noise is present;
wherein each of the decision statistics, denoted as $C_M(l)$ for $l \in \kappa$, has a cumulative distribution function (cdf), which is equal to $F_{C_M}(\tau)$, as follows $$F_{C_M}(\tau) = 1 - \frac{\Gamma(M+L)}{\Gamma(M)\Gamma(L)} \int_0^{1-\tau} t^{L-1}(1-t)^{M-1} dt$$

with M=number of N-pt FFTs to be computed, K=the number of FFT bins to be included in the decision statistics, κ=the set of FFT bins to be included in the decision statistics, L = M(K−1), and Γ(n)=(n−1)! for a positive integer n.

2. The signal detection apparatus of claim 1, wherein the decision rule computes a normalized power ratio.

3. The signal detection apparatus of claim 1, wherein the decision rule immediately adjusts to power fluctuations due to power normalization.

4. The signal detection apparatus of claim 1, wherein the decision rule represents examining the ratio of the power of the RF input within a single frequency bin to the total power of the RF input over the frequency band of interest.

5. The signal detection apparatus of claim 1, wherein the decision rule determines an exact value of a decision statistic threshold, rather than upper and lower bounds, by analytically determining the probability distribution of the decision statistics.

6. The signal detection apparatus of claim 1, wherein the decision statistic threshold ranges from zero to one.

7. The signal detection apparatus of claim 1, wherein the electronics are configured to employ the Fast Fourier Transform (FFT) to detect the presence of man-made signals within a frequency band of interest without the need for implementing any calibration or noise power estimation techniques.

8. The signal detection apparatus of claim 1, wherein the decision statistic threshold is independent of noise variance, FFT window type, and the statistics of the environment.

9. A signal detection apparatus, comprising:
a tunable bandpass filter that filters an RF input to generate a bandpass filter output signal;
an IF double balanced mixer that downconverts the bandpass filter output signal to complex baseband;
lowpass filters that receive outputs of the IF double balanced mixer, the lowpass filters being configured to act as anti-alias filters for I and Q channels and to output an IF waveform;
analog-to-digital converters (ADCs) configured to sample the IF waveform into digital samples; and
electronics configured to receive the digital samples and implement a decision rule that utilizes Fast Fourier Transforms (FFTs) of non-overlapping subsequences for a window function to generate K decision statistics whose cumulative distribution function (cdf) yield, independent of the noise variance and the FFT window type, a numerical value for the threshold, τ, of each decision statistic to determine if a man-made signal is present or to achieve a constant false alarm rate when only noise is present;
wherein each of the decision statistics, denoted as $C_M(l)$ for $l \in \kappa$, has a cumulative distribution function (cdf), which is equal to $F_{C_M}(\tau)$, as follows $$F_{C_M}(\tau) = 1 - \frac{\Gamma(M+L)}{\Gamma(M)\Gamma(L)} \int_0^{1-\tau} t^{L-1}(1-t)^{M-1} dt$$

with M=number of N-pt FFTs to be computed, K=the number of FFT bins to be included in the decision statistics, κ=the set of FFT bins to be included in the decision statistics, L=M(K−1), and Γ(n)=(n−1)! for a positive integer n.

10. The signal detection apparatus of claim 9, wherein the lowpass filters are configured such that input power is filtered outside an anti-aliasing filter cutoff frequency.

11. The signal detection apparatus of claim 9, wherein the electronics include a field-programmable gate array (FPGA).

12. The signal detection apparatus of claim 9, wherein the decision rule computes a normalized power ratio.

13. The signal detection apparatus of claim 9, wherein the decision rule immediately adjusts to power fluctuations due to power normalization.

14. The signal detection apparatus of claim 9, wherein the decision rule represents examining the ratio of the power of the RF input within a single frequency bin to the total power of the RF input over the frequency band of interest.

15. The signal detection apparatus of claim 9, wherein the decision rule determines an exact value of a decision statistic threshold, rather than upper and lower bounds, by analytically determining the probability distribution of the decision statistics.

16. The signal detection apparatus of claim 9, wherein the decision statistic threshold ranges from zero to one.

17. The signal detection apparatus of claim 9, wherein the electronics are configured to employ the Fast Fourier Transform (FFT) to detect the presence of man-made signals within a frequency band of interest without the need for implementing any calibration or noise power estimation techniques.

18. The signal detection apparatus of claim 9, wherein the decision statistic threshold that is independent of noise variance, FFT window type, and the statistics of the environment.

\* \* \* \* \*